US008768241B2

(12) United States Patent
Venable

(10) Patent No.: US 8,768,241 B2
(45) Date of Patent: Jul. 1, 2014

(54) SYSTEM AND METHOD FOR REPRESENTING DIGITAL ASSESSMENTS

(75) Inventor: Dennis L. Venable, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 740 days.

(21) Appl. No.: 12/640,426

(22) Filed: Dec. 17, 2009

(65) Prior Publication Data

US 2011/0151423 A1    Jun. 23, 2011

(51) Int. Cl.
*G09B 7/00* (2006.01)

(52) U.S. Cl.
USPC .......................................................... 434/362

(58) Field of Classification Search
USPC ................................... 434/322, 353, 354, 362
See application file for complete search history.

(56) References Cited

U.S. PATENT DOCUMENTS

| | | |
|---|---|---|
| 4,464,118 A | 8/1984 | Scott et al. |
| 4,654,818 A | 3/1987 | Wetterau, Jr. |
| 4,793,810 A | 12/1988 | Beasley, Jr. |
| 5,387,107 A | 2/1995 | Gunter |
| 5,657,256 A | 8/1997 | Swanson |
| 5,730,602 A | 3/1998 | Gierhart et al. |
| RE36,028 E | 1/1999 | Deesen et al. |
| 5,995,959 A | 11/1999 | Friedman |
| 5,995,961 A | 11/1999 | Levy et al. |
| 6,030,226 A | 2/2000 | Hersh |
| 6,120,300 A | 9/2000 | Ho |
| 6,134,559 A | 10/2000 | Brumme |
| 6,144,838 A | 11/2000 | Sheehan |
| 6,154,757 A | 11/2000 | Krause |
| 6,215,901 B1 | 4/2001 | Schwartz |
| 6,299,452 B1 | 10/2001 | Wasowicz |
| 6,515,690 B1 | 2/2003 | Back |
| 6,523,007 B2 | 2/2003 | Layng |
| 6,606,479 B2 | 8/2003 | Cook et al. |
| 6,606,480 B1 | 8/2003 | L'Allier |
| 6,673,611 B2 | 1/2004 | Thompson et al. |
| 6,755,657 B1 | 6/2004 | Wasowicz |
| 6,759,206 B1 | 7/2004 | Rubin et al. |
| 6,789,089 B2 | 9/2004 | Scoggins |

(Continued)

FOREIGN PATENT DOCUMENTS

| | | |
|---|---|---|
| EP | 553674 A2 | 8/1993 |
| EP | 0556530 | 8/1993 |

(Continued)

OTHER PUBLICATIONS

The Abecedarian Reading Assessment, Sebastian Wren, Ph.D and Jennifer Watts, Ph.D., Copyright, 2002.

(Continued)

*Primary Examiner* — Kesha Frisby
(74) *Attorney, Agent, or Firm* — Fay Sharpe LLP

(57) ABSTRACT

A method and system for processing a digital assessment template are provided. The system includes at least one tangible processor and a memory with instructions to be executed by the at least one tangible processor for processing a digital assessment template. The template which includes a description of a plurality of data structures that are configured for interpreting an assessment associated with the template. The assessment was marked with strokes by an assessment-taker who was administered the assessment and responded to at least one problem provided by the assessment. The template describes a location of the marked assessment in which to find each stroke that corresponds to a response by the assessment-taker and how to interpret the strokes. Each of the locations and how to interpret the strokes are selectable.

12 Claims, 8 Drawing Sheets

(56) References Cited

U.S. PATENT DOCUMENTS

| | | |
|---|---|---|
| 6,953,343 B2 | 10/2005 | Townshend |
| 6,983,240 B2 | 1/2006 | Ait-Mokhtar et al. |
| 7,036,075 B2 | 4/2006 | Walker |
| 7,058,567 B2 | 6/2006 | Ait-Mokhtar et al. |
| 7,147,473 B2 | 12/2006 | Harpaz |
| 7,152,034 B1 | 12/2006 | Layng |
| 7,207,804 B2 | 4/2007 | Hersh |
| 7,266,340 B2 | 9/2007 | Bresciani |
| 7,293,239 B2 | 11/2007 | Gorbet |
| 7,593,910 B1 | 9/2009 | Owen |
| 7,734,652 B2 | 6/2010 | Tamayo |
| 7,828,552 B2 | 11/2010 | Shute |
| 2003/0113698 A1 | 6/2003 | Von der Geest |
| 2003/0180703 A1 | 9/2003 | Yates et al. |
| 2003/0190593 A1 | 10/2003 | Wisnoksy |
| 2004/0023191 A1 | 2/2004 | Brown |
| 2004/0049391 A1 | 3/2004 | Polanyi |
| 2004/0076930 A1 | 4/2004 | Steinberg |
| 2004/0121298 A1 | 6/2004 | Creamer |
| 2004/0219502 A1 | 11/2004 | Bechard |
| 2005/0114160 A1 | 5/2005 | Boehme et al. |
| 2005/0138556 A1 | 6/2005 | Brun |
| 2005/0170325 A1 | 8/2005 | Steinberg |
| 2005/0197988 A1 | 9/2005 | Bublitz |
| 2005/0221266 A1 | 10/2005 | Mislevy |
| 2005/0227216 A1 | 10/2005 | Gupta |
| 2006/0040240 A1 | 2/2006 | Kopilevich |
| 2006/0241988 A1 | 10/2006 | Yaskin |
| 2006/0242003 A1 | 10/2006 | Yaskin |
| 2006/0242004 A1 | 10/2006 | Yaskin |
| 2007/0172810 A1 | 7/2007 | McCallum |
| 2007/0179776 A1 | 8/2007 | Segond |
| 2007/0190514 A1 | 8/2007 | Diaz |
| 2007/0218432 A1 | 9/2007 | Glass |
| 2008/0038708 A1 | 2/2008 | Slivka |
| 2008/0286732 A1 | 11/2008 | German |
| 2009/0204596 A1 | 8/2009 | Brun |
| 2009/0246744 A1 | 10/2009 | Lofthus |
| 2009/0271433 A1 | 10/2009 | Perronnin et al. |
| 2009/0287739 A1 | 11/2009 | Zhang |
| 2010/0075290 A1 | 3/2010 | DeYoung et al. |
| 2010/0075291 A1 | 3/2010 | DeYoung |
| 2010/0075292 A1 | 3/2010 | DeYoung |
| 2010/0100455 A1 | 4/2010 | Song |
| 2010/0157345 A1 | 6/2010 | Lofthus |
| 2010/0158707 A1 | 6/2010 | Griffiths |
| 2010/0159432 A1 | 6/2010 | German |
| 2010/0159437 A1 | 6/2010 | German |
| 2010/0159438 A1 | 6/2010 | German |
| 2010/0227306 A1 | 9/2010 | Lofthus |

FOREIGN PATENT DOCUMENTS

| | | |
|---|---|---|
| EP | 0 805 410 A | 5/1997 |
| EP | 805410 A3 | 3/1999 |
| JP | 2000123115 | 4/2000 |
| JP | 2000123115 A2 | 4/2000 |
| WO | WO 98/32107 | 7/1998 |
| WO | WO 02/21259 | 3/2002 |
| WO | WO 2004/090834 | 10/2004 |
| WO | WO2006121542 A2 | 11/2006 |

OTHER PUBLICATIONS

Chuat, "CategoriX & ClusteriX", Xerox Research Centre Europe, licensing@xrce.xerox.com (May 2005).
U.S. Appl. No. 12/638,439, filed Dec. 15, 2009, Khachatrian.
U.S. Appl. No. 12/237,692, filed Sep. 25, 2008, DeYoung.
U.S. Appl. No. 12/339,804, filed Dec. 19, 2008. DeYoung.
U.S. Appl. No. 12/339,771, filed Dec. 19, 2008, DeYoung.
U.S. Appl. No. 12/341,659, filed Dec. 22, 2008, Lofthus.
U.S. Appl. No. 12/339,979, filed Dec. 19, 2008, German.
U.S. Appl. No. 12/340,054, filed Dec. 19, 2008, German.
U.S. Appl. No. 12/340,116, filed Dec. 19, 2008, German.
U.S. Appl. No. 12/640,426, filed Dec. 17, 2009, Venable.
U.S. Appl. No. 12/701,850, filed Feb. 8, 2010, DeYoung.
U.S. Appl. No. 12/840,584, filed Jul. 21, 2010, Venable.
U.S. Appl. No. 12/958,768, filed Dec. 2, 2010, German.
Johnson, David W. et al., "An Overview of Cooperative Learning", Cooperative Learning Institute and Interaction Book Company.
Shi, Jianbo et al., "Normalized Cuts and Image Segmentation", IEEE Transactions on Pattern Alanaysis and Machine Intelligence, Vo. 22, No. 8, Aug. 2000.
Wren, Ph.D., Sbebastian et al., "The Abecedarían Reading Assessment", www.balancedreading.com, Copyright, 2002, pp. 1-49.
"Cluster Analysis." *Wikipedia, the Free Encyclopedia*. Apr. 28, 2010. Web. Jan. 11, 2011. <http://en.wikipedia.org/wiki/Cluster_analysis>.
"Cut (graph theory)." *Wikipedia, the Free Encyclopedia*. Mar. 26, 2010. Web. Jan. 11, 2011. <http://en.wikipedia.org/wiki/Cut_(graph_theory)>.
"Edmonds's Matching Algorithm." *Wikipedia, the Free Encyclopedia*. Feb. 16, 2010. Web. Jan. 11, 2011. <http://en.wikipedia.org/wiki/Edmonds's_matching_algorithm>.
"Ford-Fulkerson Algorithm." *Wikipedia, the Free Encyclopedia*. Apr. 21, 2010. Web. Jan. 11, 2010. <http://en.wikipedia.org/wiki/Ford-Fulkerson_algorithm>.
"k-medoids" *Wikipedia, the Free Encyclopedia*. Apr. 22, 2010. Web. Jan. 11, 2010. <http://en.wikipedia.org/wiki/K-medoids>.
"Matching (graph theory) )." *Wikipedia, the Free Encyclopedia*. Apr. 19, 2009. Web. Jan. 11, 2011. <http://en.wikipedia.org/wiki/Matching_(graph_theory)>.
International Search Report for EP 09 17 7730 dated Apr. 16, 2010, mailed Apr. 28, 2010.

Chris' favorite food was pickle potato chips. Chris wanted to eat them at (sour, for, every) meal. He wouldn't eat anything but (pickle, ate, vanilla) potato chips.

Chris ate chips for (eat, breakfast, food) instead of cereal and juice. He (ate, gave, the) chips for lunch instead of a (dog, sandwich, smelled) and fruit. Chris ate chips for (pickles, supper, no) instead of roast beef and corn. (Wanted, Teeth, He) even ate chips instead of vanilla (pickle, ice, and) cream for dessert.

Chris ate so (many, like, sour) chips he smelled sour like pickles. (Instead, His, Chris) hands, his clothes, and his breath (every, it, all) smelled sour. No one wanted to (hand, pour, talk) to Chris because of his sour (breath, night, long). The dog wouldn't even go near (Chris, even, pickle). The kisses Chris gave his mom (clothes, but, and) dad each night smelled like pickles (chip, because, but) his teeth smelled like pickles. It (were, didn't, over) matter how long he brushed his (night, for, teeth) or how much dental floss and (toothpaste, boys, like) he used. Chris couldn't get rid (of, for, and) the pickle smell.

Chris' mom and (food, how, dad) were becoming quite concerned about their (boys, son, brushed). Chips weren't healthy for growing boys. (Said, Besides, To), they didn't like the smell of (Chris, healthy, sour) pickles that had taken over their (home, the, night).

"I know how much you like (chips, bowl, kiss), Chris," said his father. "You eat (on, his, them) all the time, but growing boys (smell, had, need) more than junk food."

Chris listened (like, to, in) his dad as he munched on (a, of, but) pickle potato chip.

The next morning, (mom, Chris, listened) started to pour himself a bowl (munched, for, of) chips but stopped. He remembered what (himself, his, reached) dad told him.

"Why am I (long, always, cereal) eating chips?" he asked himself. He (decided, tasted, one) it was time to try something (all, new, big).

Chris' favorite food
Grade 3, Passage 1

Copyright 2002 Edformation, Inc.
All Rights Reserved

FROM FIG. 7A

FIG. 7B

SYSTEM AND METHOD FOR REPRESENTING DIGITAL ASSESSMENTS

RELATED APPLICATIONS

The present application is further to U.S. patent application Ser. No. 11/749,192, filed on May 16, 2007; U.S. patent application Ser. No. 12/054,824, filed on Mar. 25, 2008; and U.S. patent application Ser. No. 12/624,960, filed on Nov. 24, 2009.

The following applications are related to the present disclosure and are all incorporated by reference herein in their entirety: U.S. patent application Ser. No. 12/339,979 to German et al., entitled "SYSTEM AND METHOD FOR RECOMMENDING EDUCATIONAL RESOURCES," filed on Dec. 19, 2008; U.S. patent application Ser. No. 12/340,054 to German et al., entitled "SYSTEM AND METHOD FOR RECOMMENDING EDUCATIONAL RESOURCES," filed on Dec. 19, 2008; U.S. patent application Ser. No. 12/340,116 to German et al., entitled "SYSTEM AND METHOD FOR RECOMMENDING EDUCATIONAL RESOURCES," filed on Dec. 19, 2008; U.S. patent application Ser. No. 12/237,692 to DeYoung, entitled "AUTOMATIC EDUCATIONAL ASSESSMENT SERVICE," filed on Sep. 25, 2008; U.S. patent application Ser. No. 12/339,804 to DeYoung, entitled "AUTOMATIC EDUCATIONAL ASSESSMENT SERVICE," filed on Dec. 19, 2008; U.S. patent application Ser. No. 12/339,771 to DeYoung, entitled "AUTOMATIC EDUCATIONAL ASSESSMENT SERVICE," filed on Dec. 19, 2008; and U.S. patent application Ser. No. 12/341,659 to Lofthus et al., entitled "SYSTEM FOR AUTHORING EDUCATIONAL ASSESSMENTS," filed on Dec. 22, 2008.

BACKGROUND

The present disclosure relates generally to a system and method for representing digital assessments. In particular, the present disclosure relates to a system and method for representing digital assessments, including generating digital assessment representations and associating information extracted from a marked paper assessment based on a digital assessment representation with rules for interpreting the extracted information.

An assessment is a test administered by a teacher or evaluator to a student for assessing the student's knowledge or understanding of a particular subject. The type of assessment (or test) of interest in this disclosure is created by a teacher or obtained from another source by the teacher. The assessment may have been created by hand or by using a computer-based word processor, after which it is printed out and/or copied onto paper. The assessment is administered to student by giving the student or other assessment-taker the paper copy to mark-up. The assessment instructs the student to mark his answers on the assessment provided to him by marking his answers at respective selected locations of the paper specified to him. The teacher evaluates each student's marked assessment, including determining when the markings made by the student indicate that the student answered the question correctly or understood the material being tested.

SUMMARY

The present disclosure is directed to a system for processing a digital assessment template. The system includes at least one tangible processor and a memory with instructions to be executed by the at least one tangible processor for processing a digital assessment template. The template which includes a description of a plurality of data structures that are configured for the purpose of interpreting an assessment associated with the template. The assessment was marked with strokes by an assessment-taker who was administered the assessment and responded to at least one problem provided by the assessment. The template describes a location of the marked assessment in which to find each stroke that corresponds to a response by the assessment-taker and how to interpret the strokes. Each of the locations and how to interpret the strokes are selectable.

The present disclosure is also directed to a processing system for processing a digital assessment template. The processing system includes at least one tangible processor and a memory with instructions to be executed by the at least one tangible processor for accessing a digital assessment template. The template which includes a description of a plurality of data structures that are configured for interpreting an assessment associated with the template. The assessment was marked with strokes by an assessment-taker who was administered the assessment for responding to at least one problem provided by the assessment. The template describes a location of the marked assessment in which to find each stroke that corresponds to a response by the assessment-taker and how to interpret the strokes. The template further describes at least two hierarchical levels of zones, including a plurality of item zones having a low hierarchical level and at least one collection zone having a higher hierarchical level.

Each collection zone of the at least one collection zone is associated with a different problem of the at least one problem and includes a group of at least one item zone of the plurality of item zones. Each item zone of the plurality of item zones is associated with a location of the marked assessment in which to find each stroke that corresponds to a response by the assessment-taker. What's more, each of the locations, how to interpret a strokes, and the number of item zones included in each group are selectable. The processing the template includes at least one of evaluating the marked assessment using the template, interpreting the marked assessment using the template, analyzing the marked assessment using the template, and creating the template.

The present disclosure is further directed to a computer-readable medium storing a series of programmable instructions configured for execution by at least one hardware processor for performing a method for processing a digital assessment template. The method includes the steps of storing a digital assessment template which includes a description of a plurality of data structures that are configured for interpreting an assessment associated with the template. The assessment was marked with strokes by an assessment-taker when administered the assessment for responding to at least one problem provided by the assessment. The template describes a location of the marked assessment in which to find each stroke that corresponds to a response by the assessment-taker and how to interpret the strokes. Each of the locations and how to interpret the strokes are selectable. Processing the template includes at least one of evaluating the marked assessment using the template, interpreting the marked assessment using the template, analyzing the marked assessment using the template, and creating the template.

Other features of the presently disclosed processing system and method will become apparent from the following detailed description, taken in conjunction with the accompanying drawings, which illustrate, by way of example, the presently disclosed processing system and method.

BRIEF DESCRIPTION OF THE DRAWINGS

Various embodiments of the present disclosure will be described below with reference to the figures, wherein:

FIG. 6 is a pictorial representation of a marked EAS assessment in accordance with the present disclosure;

FIGS. 7A and 7B are pictorial representations of EAS assessments in accordance with the present disclosure;

DETAILED DESCRIPTION

Figure 1:
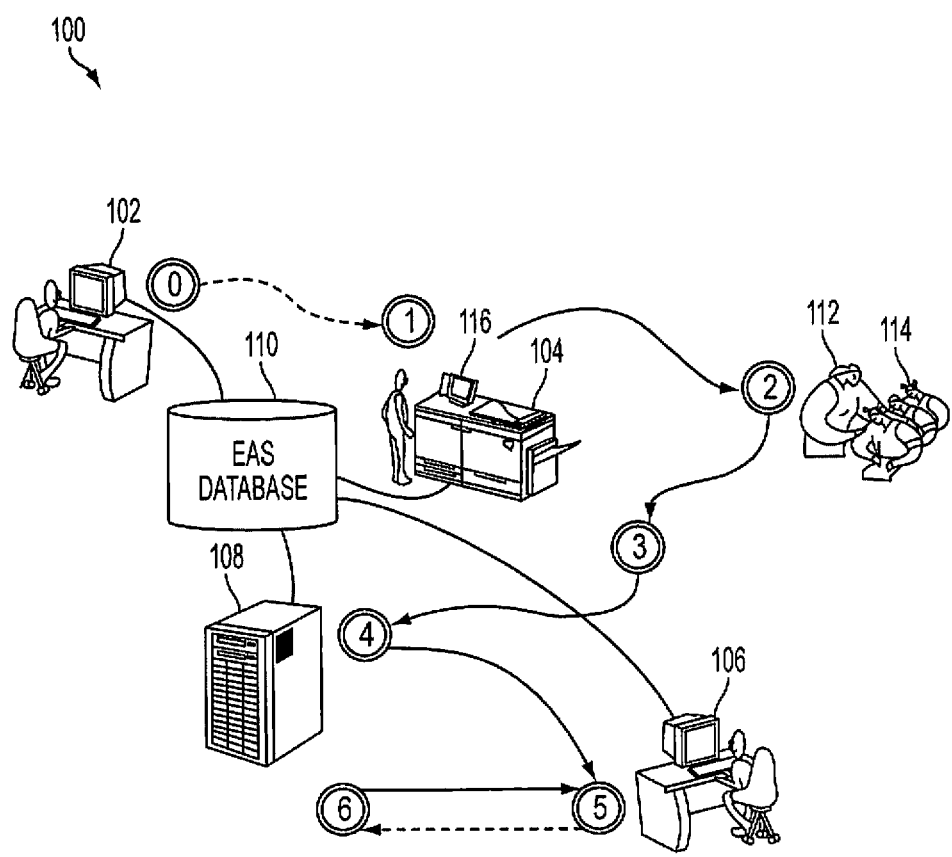
FIG. 1 is a schematic flow diagram of an educational assessment service (EAS) system in accordance with the present disclosure.

Referring now to the drawing figures, in which like reference numerals identify identical or corresponding elements, the system and method for servicing educational assessments in accordance with the present disclosure will now be described in detail. With initial reference to FIG. 1, an exemplary educational assessment service (EAS) system in accordance with the present disclosure is illustrated and is designated generally as EAS system 100. Exemplary components of the EAS system 100 include a first EAS workstation 102, an EAS multi-functional device (MFD) 104, a second EAS workstation 106, an EAS evaluator 108, and an EAS database 110. An EAS assessment is generated at the first EAS workstation 102 and stored on the EAS database 110.

The EAS assessment is administered, e.g., by a teacher or administrator 112, to one or more assessment-takers 114, such as students or applicants (e.g., for a position, registration, or certification), wherein each assessment-taker is provided with his individual copy of the assessment. The EAS assessment may be digitally created (e.g., by the first workstation 102) and printed (e.g., by the EAS MFD 104), but this is not required. The EAS assessment may be manually created, e.g., typed or handwritten. However, it is necessary that a digital version of the EAS assessment be created or obtained, such as by scanning the EAS assessment. It is also necessary that a digital EAS assessment template (also referred to as an EAS template) that corresponds to the EAS assessment be created or obtained. The EAS template is described in greater detail below.

The assessment-takers 114 take the EAS assessment, including marking the EAS assessment with strokes (e.g., hand drawn strokes using a writing implement, such as a pencil, crayon or pen) that indicate responses to at least one problem provided by the assessment. The term "problem" is applied broadly herein to refer to a prompt for the assessment-takers response or a gauge of the assessment-takers progress with respect to a task. For example, a problem may include a math problem, a reading selection that the assessment-taker reads and is gauged for fluency, a survey question asking for the assessment-takers opinion, etc. In some cases a person other than the assessment-taker marks the EAS assessment, but for the purpose of simplicity, reference to markings by an assessment-taker shall also refer to any other person that is marking the EAS assessment. The EAS assessment may be administered to the assessment-takers in a variety of ways, including in writing, digitally, or in audio. When administered in writing, the assessment-taker may mark the EAS assessment itself or may mark one or more specially provided answer sheets. For simplicity and clarity, the term "marked assessment" includes any marked answer sheets. The marked assessment may include one page (e.g., a paper page) or multiple pages.

When administered digitally, the EAS assessment is presented to the assessment-taker via a display device of a computing device, such as personal computer or workstation. The assessment-taker can mark the EAS assessment with digital strokes by using a user input device, such as a keyboard. When administered in audio, the assessment-taker may listen to the audio and mark answers on an answer sheet that is included with the EAS assessment. It is also envisioned that the assessment-taker may answer the EAS assessment verbally. Whether the answer is provided by marking a paper using a handwriting instrument, marking a digital file using a computer, marking a digital recording using a voice, the mark is referred to herein as a stroke. Furthermore, each of these forms of administering the EAS assessment may include tracking the timing of the strokes. In each of the scenarios, there are delimiters that specify to the stroke lifting module 320 where or how to find the strokes. These delimiters are provided by the EAS template. Furthermore, there are typically indicators to the assessment-taker as to where or when to mark a stroke. Furthermore, regardless of how the assessment is administered, the marked assessment may be divided into sections equivalent to the pages of a multi-page paper assessment. Those sections are referred to as pages.

The marked-up paper EAS assessments are submitted to the EAS MFD 104 to be scanned and then stored. All of the scanned pages may be stored in one file, or each scanned page may be stored in a separate file. In the present example, each scanned page is stored in a separate file, e.g., a .TIF file. The stored EAS assessments are evaluated by the EAS evaluator 108. The evaluating includes consulting the digital version of the EAS assessment and the EAS template. The evaluated EAS assessments may be validated and annotated by a user of the second workstation 106. The validated EAS assessments are submitted to the EAS evaluator which may generate reports relating to the validated EAS's.

The first and second EAS workstations 102 and 106, respectively, are computing devices, such as a personal computer (PC), a handheld processing device (such as a personal digital assistant (PDA)), a mainframe workstation, etc. Each of the computing devices includes a hardware processing device, such as a CPU, microprocessor, ASIC, digital signal processor (DSP), etc.; a memory device, such as RAM, ROM, flash memory, removable memory, etc.; a communication device for enabling communication with other computing devices; a user input device, such as a keyboard, pointing device (e.g., a mouse or thumbwheel), keypad, etc.; and an output device, such as a monitor, speaker, etc.

Each of the first and second workstations 102 and 106 may be in data communication with database 110 and/or with the EAS MFD 104. The first and second workstations 102 and 106 may be configured as a single workstation which is in data communication with the EAS MFD 104, the EAS evaluator 108, and the database 110 and has the functionality of the first and second workstations 102 and 104. The second workstation 106 may further be in data communication with the EAS evaluator 108. The first EAS workstation 102 is operated by a user, also referred to as an assessment author, for creating an EAS template that corresponds to an EAS assessment. The first EAS workstation 102 may also be used to create the EAS assessment. The second EAS workstation 106 is operated by a user for reviewing evaluated assessments for the purpose of validating or annotating the assessments. The users of the first and second workstations 102, 106 may be the same persons, or different persons.

Figure 2:
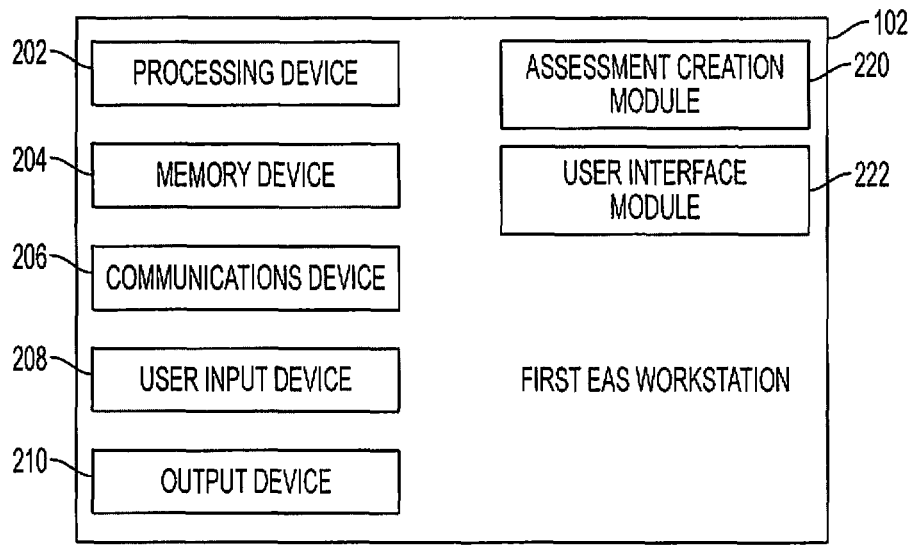
FIG. 2 is a block diagram of a first EAS workstation of the EAS system in accordance with the present disclosure.

With reference to FIG. 2, first workstation 102 is depicted. As shown, first workstation 102 includes hardware processing device 202, memory device 204, communication device 206, user input device 208, and output device 210. Additionally, the first workstation 102 includes an assessment creation module 220 and a user interface (UI) module 222, each of which is a software module including a series of programmable instructions capable of being executed by the processing device 202. The series of programmable instructions, stored on a computer-readable medium, such as memory device 204, are executed by the processing device 202 for performing the functions disclosed herein and to achieve a technical effect in accordance with the disclosure. When executing on the processing device 202, the assessment creation module 220 and the user interface module 222 provide an assessment authoring tool that the assessment author can use to create an EAS template.

The assessment creation module 220 includes an algorithm for creating an EAS template associated with an EAS assessment and optionally further for creating the EAS assessment. The EAS template provides a description of data structures and their attributes that are processed by a processor executing machine executable software instructions for interpreting a marked EAS assessment associated with the EAS template. The EAS template describes at least two zones having different hierarchical levels. A zone on a higher hierarchical level includes or corresponds to one or more zones in the next lower hierarchical level.

The EAS template describes locations of the marked EAS assessment in which to find each stroke that corresponds to a response by the assessment-taker. Furthermore, the EAS template describes how to interpret the strokes and how to score the problems provided by the EAS assessment. More specifically, each of the zones is associated with one or more zone attributes that describe how the zones and marks are to be treated by the EAS evaluator 108. The creator of the EAS template may select factors such as the locations where to find strokes indicating responses, how to interpret the strokes, how to score each problem, and the number of item zones included in each group.

The UI module 222 interfaces with the user input device 208 and the output device 210, e.g., by providing a graphical user interface (GUI) for receiving input from and providing output to the user of the first workstation 102. The assessment creation module 220 interacts with the UI module 222 such that the assessment creation module 220 allows the user to interactively create an EAS assessment, including assigning physical areas on the page(s) of the assessment to zones of the EAS template and associating each of the zones with selected zone attributes.

With reference back to FIG. 1, the EAS MFD 104 includes printing, scanning and hardware processing devices that provide printing, scanning and processing functionality, respectively. The EAS MFD 104 may have access to an EAS database 110. Additionally, the EAS MFD 104 may be provided with a user interface 116, which may include, for example, one or more user input devices (e.g., a keyboard, touchpad, control buttons, touch screen, etc.) and a display device (e.g., an LCD screen, monitor, etc.). The EAS MFD 104 prints a selected EAS assessment, such as upon request from a workstation, such as EAS workstation 102, or upon a user request via the user interface 116. The EAS MFD 104 may receive the selected EAS assessment from the requesting workstation, or may retrieve the EAS assessment, such as by accessing the EAS database 110 or a local storage device provided with the EAS MFD 104 (e.g., a hard drive, RAM, flash memory, a removable storage device inserted into a storage drive (e.g., a CD drive, floppy disk drive, etc.) provided with the EAS MFD 104). Additionally, the EAS MFD 104 scans an EAS assessment submitted to it and generates an image of the scanned EAS assessment, also referred to herein as the scanned EAS assessment. The scanned EAS assessment is then stored, such as by storing it in the EAS database 110 or in the local storage device provided with the EAS MFD 104. Storing into the EAS database 110 can mean storing the scanned EAS assessment image data directly into the EAS database 110, or storing the image data on a disk drive or other permanent storage media that is accessible to the EAS database 110 and storing the access path to the image data into the database.

Figure 3:
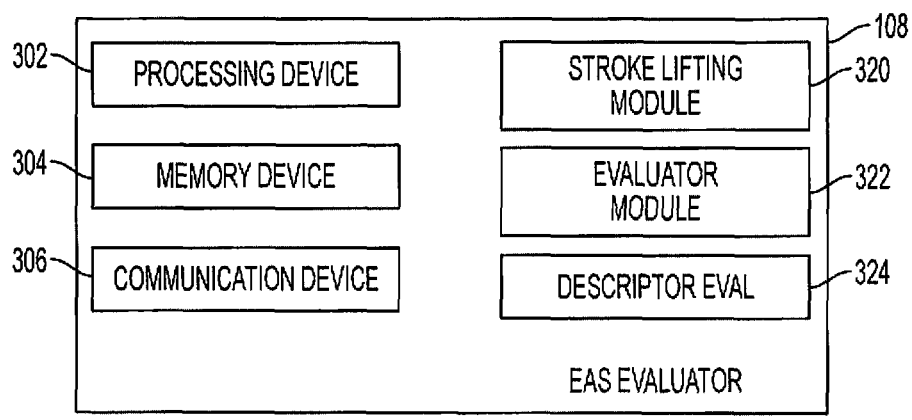
FIG. 3 is a block diagram of an EAS evaluator of the EAS system in accordance with the present disclosure.

With reference to FIGS. 1 and 3, the EAS evaluator 108 includes at least a hardware processing device 302, such as a CPU, microprocessor, etc.; a memory device 304, such as RAM, ROM, flash memory, removable memory, etc.; a communication device 306 for enabling communication with other computing devices. The EAS evaluator 108 receives scanned EAS assessments or retrieves them from storage, such as from the EAS database 110. The EAS evaluator 108 includes a stroke lifting module 320 that recognizes strokes that were made by an assessment-taker 114 on an assessment that is being evaluated, associates a location with the lifted strokes, associates marking attributes with the lifted strokes and generates corresponding location and marking attribute data. The stroke lifting module 320 may use the digital version of the EAS assessment to distinguish between marks that are part of the EAS assessment and strokes that were marked by the assessment-taker. An evaluator module 322 associates the lifted strokes, based on their corresponding locations and marking attribute data, with the EAS assessment's EAS template. The evaluator module 322 uses the association between the lifted strokes and the EAS template, as well as instructions provided by the EAS template, to evaluate the scanned assessment. A descriptor evaluator module 324 dynamically evaluates Descriptor expressions (described further below) associated with the EAS template module during evaluation of the scanned assessment.

The strokes lifting module 320 processes a digital version (e.g., scanned) of the EAS assessment, recognizes which markings of the scanned assignment are strokes indicating answers provided by the assessment-taker 114 when taking the assessment, and generates data that identifies location and other attributes of the strokes. The generated data may be configured as metadata, for example. The evaluator module 322 evaluates the scanned assessment. Evaluation of the scanned assessment may include assigning a score (e.g., a percentage correct grade or an academic grade, e.g., A, B+, etc.) to the assessment. The evaluator module 322 processes the recognized strokes, uses the associated location information to determine for each stroke within which zones of the EAS template the stroke belongs. The zones are hierarchical such that a first zone can be included within a second zone. In this case, a stroke which belongs within the first zone also belongs within the second zone. The evaluator module 322 uses the attributes associated with the stroke and the attributes associated with the zones to which the stroke belongs to evaluate the stroke, such as to determine when it should be graded as correct or incorrect. The actual evaluating of the stroke is performed using a rubric which is provided by the EAS template. More than one rubric may be used when evaluating a single EAS assessment. The evaluator module 322 is described in further detail below. Each rubric is a set of software instructions that define how the marks are analyzed and converted to grades, where the terms grades refers to a score (e.g., a percentage or academic letter grade A, A−, B+, B, etc.). The rubric may be created, for example, using the .NET platform implementing the IRubric interface, but the disclosure is not limited thereto.

The stroke lifting module 320, the evaluator module 322, and the descriptor evaluator module 324 are each software modules including a series of programmable instructions capable of being executed by the processing device 302. The series of programmable instructions, stored on a computer-readable medium, such as memory device 304, are executed by the processing device 302 for performing the functions disclosed herein and to achieve a technical effect in accordance with the disclosure. The modules 320, 322 and 324 may be combined are separated into additional modules.

The database 110 includes at least one storage device, such as hard drive or a removable storage device (e.g., a CD-ROM) for storing information created or operated upon by one component of the EAS system 100 that needs to be retrieved or received by another component or the same component at a later time. The database 110 may be a central database, a distributed database, or may include local storage associated with one or more of the components of the EAS system 100. The components may share information, such as EAS assessments, scanned EAS assessments, validated EAS assessments, evaluated EAS assessments and reports related to evaluations of EAS assessments, by storing information on and retrieving information from database 110. The method of sharing information may be done in a number of ways, such as a first component notifying a second component when a particular file is available for the second component to retrieve or process; the first component sending the file to the second component, or the second component checking the database 110 at regular intervals for files that it needs to retrieve for processing.

The structure and/or functionality associated with the EAS MFD 104, the second EAS workstation 106, and portions of the EAS evaluator 108, namely the structure of the EAS evaluator 108 and the functionality of the stroke lifting module 320, are further described, either to supplement the above description or provide alternative designs, by the Related Applications enumerated above, each of which has been incorporated herein by reference in their entirety.

Figure 4:
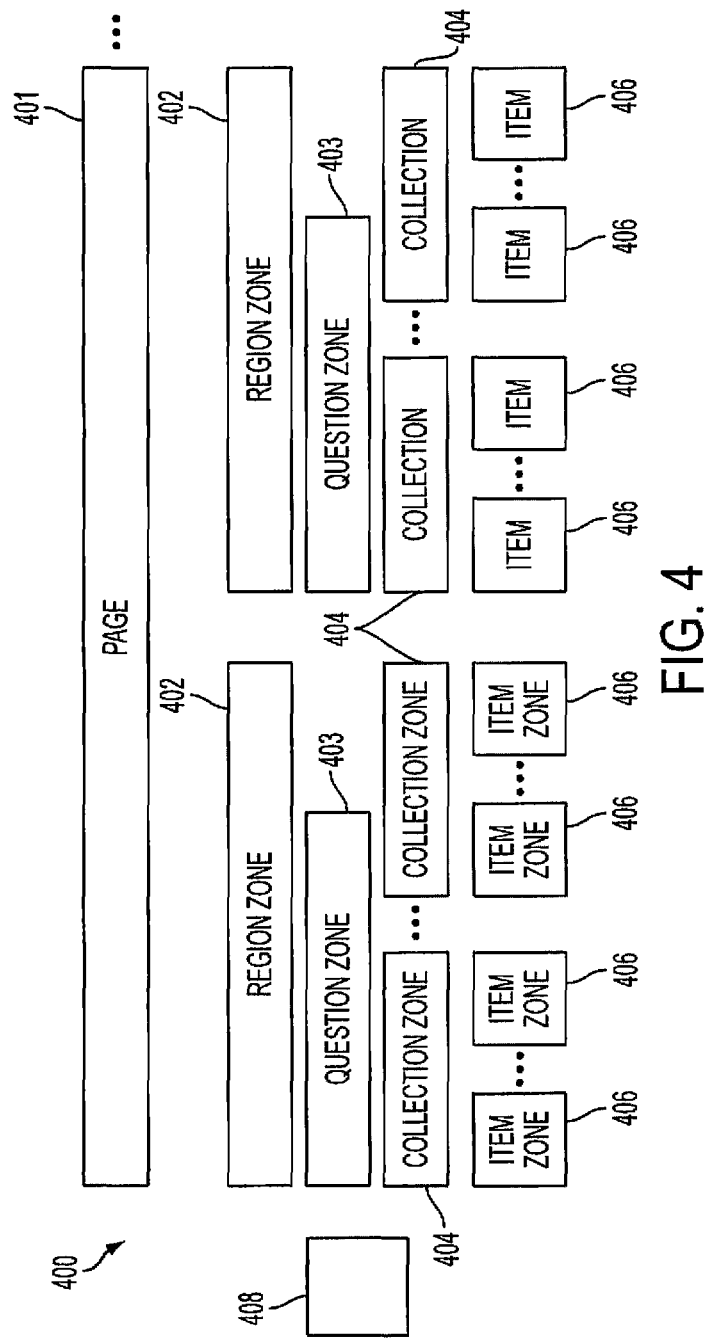
FIG. 4 is a schematic representation of an EAS assessment template in accordance with the present disclosure.

With reference to FIG. 4, the zones are now described. Exemplary EAS template 400 is shown having a page 401 to correspond to each of the pages of the scanned EAS assessment. The pages 401 correspond to the pages of the scanned EAS assessment in a one to one correspondence. Each page 401 includes three (optionally four) types of hierarchical zones. It is envisioned that if the scanned EAS assignment is not divided into separate page files, that the page 401 structure may be eliminated. At the highest hierarchical level are the region zones 402 (also referred to as regions 402). The region zones 402 each include one or more collection zones 404 (also referred to as collections 404). Each page 401 includes one or more collection zones 404 that correspond to the problems of the one or more problems included with the corresponding page if the scanned EAS assessment, all of the region zones 402 that include the included one or more collection zones 404, and all of the item zones 406 that are included in the included one or more collection zones 406.

Optionally, a region zone 402 may contain one or more question zones 403, each of which may contain one or more collection zones 404. A question zone allows collection zones to be grouped, allowing questions to consist of multiple parts. The collection zones grouped within a question zone 403 have a common quality, such as being associated with similar types of problems, e.g., fraction math problems. For example, a problem labeled problem 5 may be associated with a question zone 403 and may have two parts, 5A and 5B. Each of 5A and 5B would correspond to a different collection zone 404, both of which are included in the question zone 403. It is envisioned that the question zone 403 is mandatory, but is null if not used. The collection zones 404 each include one or more item zones 406 (also referred to as items 406). The collection zones 404 represent gradable questions of the EAS assessment. The collection zones 404 included in a particular region zone 402 are grouped together to belong to the same region zone 404 because of some common quality, such as relating to a particular academic subject (e.g., math, vocabulary, etc.) or having a particular format (such as multiple choice, fill in the blank, matching, etc.).

An item zone 406 represents a single entity associated with an assessment question that can be marked with a stroke. Each item zone 406 is associated with a location or area of the EAS assessment, such as a rectangular area, which is designated for marking by the assessment-taker 114. The location associated with an item zone 406 is a digital representation that corresponds to a physical location on a physical copy of the EAS assessment or an image, such as digital image, of the EAS assessment. The stroke lifting module 320, as per information provided in the EAS template, lifts strokes from the locations in the scanned EAS assessment associated with item zones 406. With two exceptions discussed further below, strokes outside of locations on the scanned EAS assessment associated with item zones 406 are ignored, e.g., by the stroke lifting module 320, or the evaluator module 322. The item zones 406 are defined by the EAS template and do not have to be visibly delimited on the EAS assessment page. However, it is recommended to print a delimiter (e.g., a circle or box) indicating the location associated with item zones 406, on the EAS assessment page, to indicate to the assessment-taker 114 where to place his or her strokes. An identification code zone 408 is further provided as a designated location of each page of the EAS assessment in which an identification code identifying the particular assessment is included. The identification code is typically a barcode, but other identification marks are possible. The identification zone 408 is not related hierarchically to the other zones.

Unlike item zones 406, region zones 402 and collection zones 404 are logical zones that are not required to have a physical limitation with respect to the page of an EAS assessment. Collection zones 404 included in a particular region zone 402 are included in the region zone 402 because they are assigned to the region zone 402 based on a logical grouping, and not because of their location on the page(s) of the EAS assessment. Similarly, item zones 402 included in a particular collection zone 404 are included in the collection zone 404 because they are assigned to the collection zone 404 based on a logical grouping, and not because of their location on the page(s) of the EAS assessment.

In the present example, the span of each region, collection and item zone is limited to the page that it is included in. In other words, region, collection and item zones do not span more than one page. It is envisioned that in accordance with design choice, region, collection and/or item zones could span more than one page, but this would have to be provided for, such as by adjusting the algorithm executed by evaluator module 320 accordingly.

Figure 5:
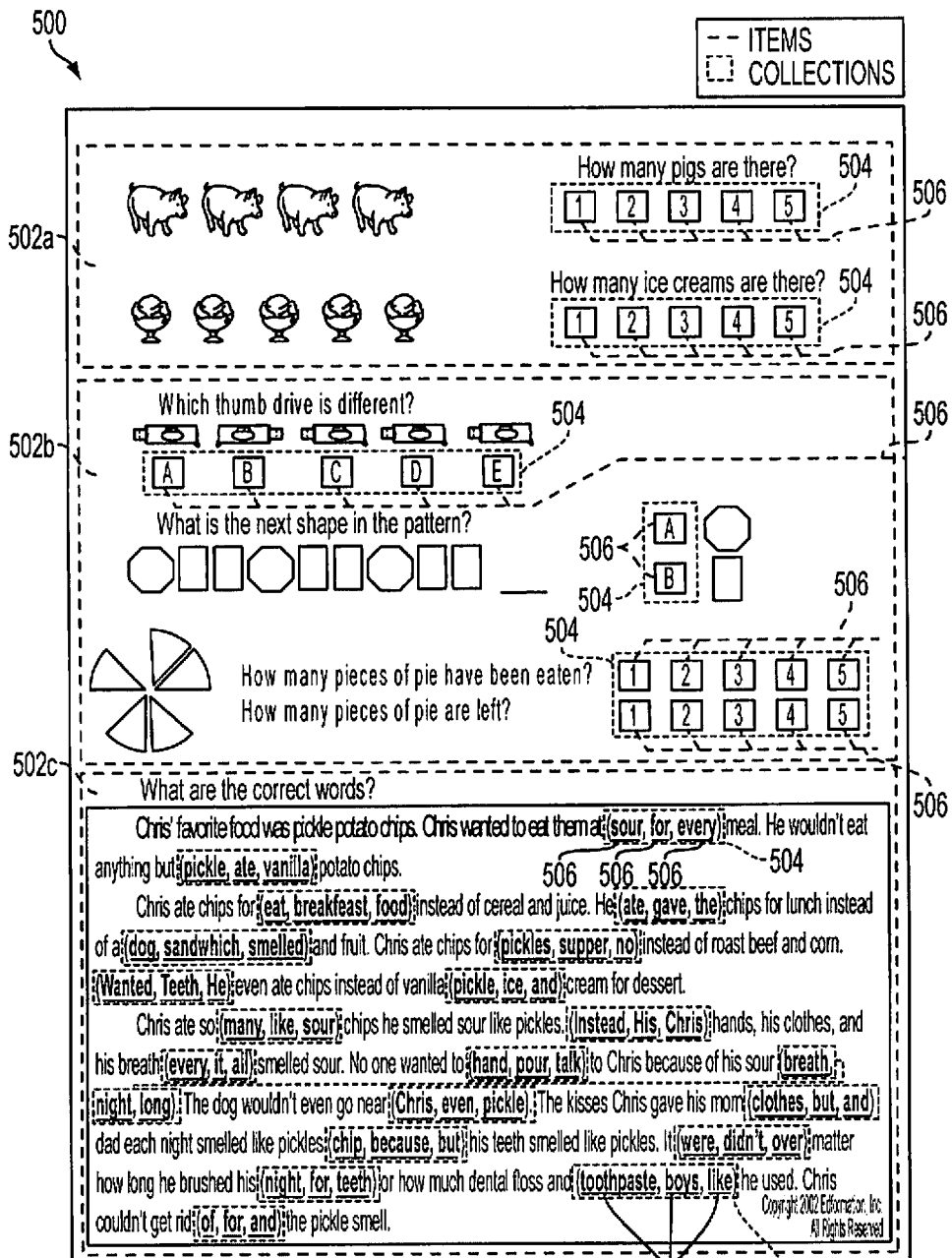
FIG. 5 is a pictorial representation of a generated EAS assessment in accordance with the present disclosure.

FIGS. 5-7 show layouts of exemplary EAS assessment pages and various types of collection zones 404. FIG. 5 shows a sample EAS assessment page 500 having information arranged in zones. Three different regions, 502a, 502b, and 502c are designated on the page. Region 502a includes two collections 504, each representing questions that test counting skills. Region 502b includes three collections 504, each representing questions that test spatial concept skills. Region 502c includes numerous collections 504, each representing questions that test skills related to vocabulary and content. The collections 504 are shown shaded. In this example, each collection 504 shown includes two or more items 506 which are indicated by dotted lines.

In the example shown, regions 502a, 502b, and 502c are each bounded by a rectangular border. The rectangular borders are described by the attributes associated with the respective region 502 and may or may not be visible on the page. However, it is not required that the regions 502 have a physical extent. Rather, they are logical groupings of collections 504 and are defined by region designations of the respective collections 504 that indicate to which region 502 each collection 504 belongs. The sample EAS assessment page 500 provides examples of two different types of collections 504, with the type of each collection 504 indicated by attributes associated with the collection 504.

FIG. 6 shows a sample page 600 of a printed EAS assessment which is marked with strokes 606 by an assessment-taker 114. Registration marks 602 are used to aid the stroke lifting module 320 to register the scanned EAS assessment with an image of the originally created EAS assessment for lifting the strokes 606. Optical code 604, which is associated with the identification code zone 408, contains identifying information about assessment-taker 114 and/or the EAS assessment. The printed text in the body of the page 600 belongs to a region 402 that may span more than the page 600 shown. Multiple collections 404 each including multiple items 406 are shown. The assessment-taker 114 has selected a single item 406 from each collection 404 by marking the selected item with a stroke 606. The attributes associated with the region 402, the collections 404 and the items 406 are used to evaluate the lifted strokes 606. The sample EAS assessment page 600 provides examples one type of collection 404, with the type of each collection 404 indicated by at least one attribute associated with the collection 404.

Figure 7A:
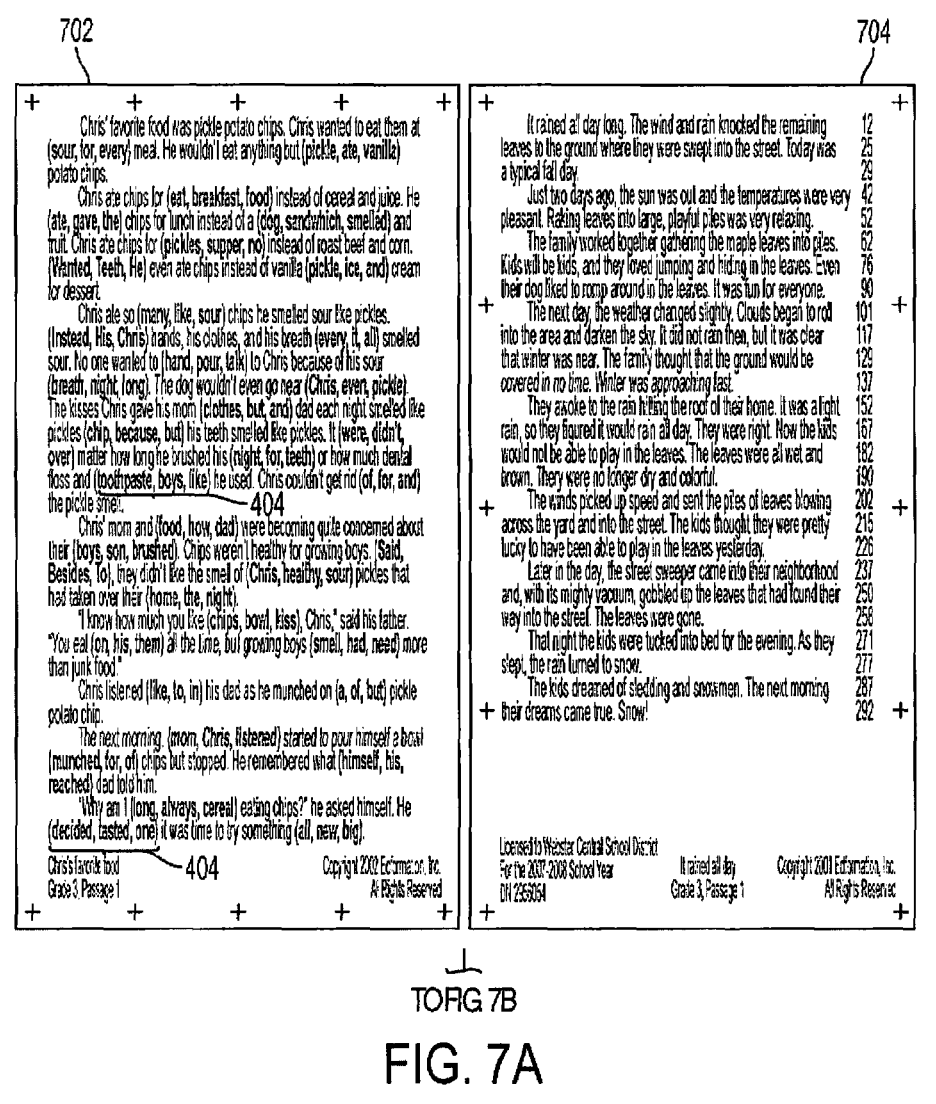
Figure 7B:
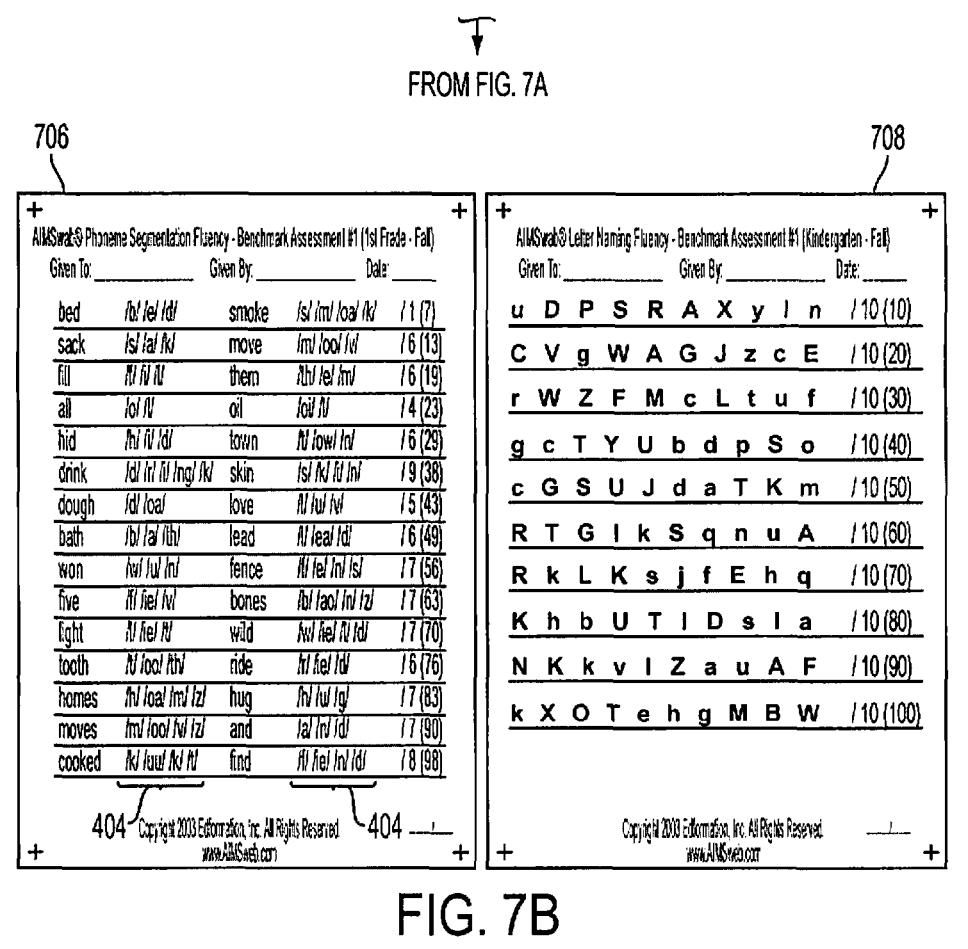

FIGS. 7A and 7B show sample pages 702, 704, 706, and 708. The text on each sample page 702, 704, 706, and 708 belongs to a different region 402. The sample pages 702, 704, 706, and 708 provide examples of various types of collections 404, with the type of each collection 404 indicated by attributes associated with the collection 404.

The EAS template 400 is a file that the evaluator module 322 and descriptor evaluator module 324 can read and process. In the present example, the EAS template 400 is a Binary Large OBject (BLOB) XML file. The evaluator module 322 is written in a software language, where the language or platform supporting the language may be selected in accordance with design choice. In the present example, the evaluator module 322 is written using the .NET platform, but it is envisioned that other software languages or platforms may be used. The EAS template 400 contains a description of where strokes should be found on the assessment and how to interpret the strokes. The evaluator module 322 interprets an assessment associated with the template by using the EAS template 400.

When creating the EAS template 400, the user of the first workstation 102 designates for each item zone 406 an associated location on a particular EAS assessment page, the collection zone 404 that the item zone 406 is associated with, and at least one associated item attribute. Optionally, the user specifies for each question zone for each collection zone, and a region zone for each question zone. The user further specifies for each collection zone 404 the region zone 402 that the collection zone 404 is associated with and at least one associated collection attribute. If the collection zone 404 is associated with an optional question zone 403, then instead or in addition to specifying the region zone 402 that the collection zone 404 is associated with, the user specifies the question zone 403 that the collection zone is associated with. If any optional question zones 403 are included in the EAS template 400, the user specifies for each question zone 403 at least one associated question attribute, and furthermore the region zone 402 that the question zone 403 is associated with. In addition, the user specifies for each region zone 402 at least one associated region attribute. When a user does not specify a zone or attribute, default values may be used.

Attributes associated with the four zones will now be discussed. The attributes listed for each of the zones are exemplary and are not limited to the attributes that are listed below. Additionally, the description of each attribute is exemplary and may be expanded or contracted to include different features. The creator of the assessment template lists all attributes that he wishes to enable together with specifications associated with each enabled attribute as necessary. When mandatory attributes and specifications are not listed, default values are used.

Beginning with the region attributes, several region attributes are available for association with a region zone 402, including Rubric, Description, Descriptor, Rect and Progress Mark. All region attributes except Rubric are optional.

The Rubric attribute specifies one or more algorithms that can be used to score problems, e.g., by implementing rules for scoring the answer marked for each collection zone 404 included in the region zone 402. The algorithms are stored in an available software library. The algorithm processes the marks determined by the stroke lifting module 320 to ultimately determine if the collection zone 404 was answered correctly or incorrectly and generates a score or other indicator that corresponds to the correctness of the answers corresponding to all of the collection zones 404 in the region zone 402 that are being scored. A single EAS template may use the same Rubric attribute or different Rubric attributes for scoring answers marked in each region zone or collection zone. In the example shown, all collection zones 404 within the region zone 402 associated with the Rubric attribute are scored using the same Rubric attribute. It is envisioned that a Rubric attribute may be associated with individual collection zones 404 so that the individual collection zones 404 can be scored using different Rubric attributes. Scores based on the output of the Rubric attributes can be assigned to a region zone 402 or to individual collection zones 404.

In the current example, Rubric attributes include algorithms which are built in the .NET framework implementing the IRubric interface. Table 1 indicates an exemplary algorithm of a Rubric attribute:

TABLE 1

EXAMPLARY RUBRIC ALGORITHM

```
public interface IRubric
{
    // returns descriptove string
    string Description { get; }
    // set the AssessmentTemplate
    AssessmentTemplate Assessment { get; set; }
    // Grade all collections associated with the specified region
        EASGrade AutoGrade(EASGrade egd, List<SMark> marks,
RegionZone rz, SMark prm);
}
```

The Description attribute includes a fixed string that contains a readable description of the EAS assessment.

The Descriptor attribute may include a simple fixed-string or one or more expressions, e.g., using the .NET platform implementing the IRubric interface that are dynamically evaluated during the EAS analysis process and generate an output result, e.g., a value or one or more strings which are stored with the grading results. The descriptor attribute is described in greater detail below in connection with the connection attributes and may be adapted to be appropriate for the region attributes.

The Rect attribute describes a rectangular boundary that bounds all of the collection zones 404 included in the associated region zone 402 relative to the beginning of the page, e.g., the upper left hand corner of the page, that the region zone 402 is included in. Region zones 402 are logical groupings of collection zones 404 that may not have a rectangular bounding area. But when they do, the boundary is stored in this attribute. Other types of spatial, digital or temporal boundaries are envisioned as well, such as digital section breaks that divide a digital document into sections, or digital time stamps that provide temporal boundaries.

The Progress Mark (PM) attribute specifies a symbol, such as a right square bracket "]," that is used to track progress made by an assessment-taker. For example, in an EAS assessment for assessing reading fluency or speed, the EAS assessment is meant to measure how much progress the EAS-taker made by measuring how much of the EAS assessment the assessment-taker was able to read in a timed interval. The PM attribute enables the automatic capture of progress. When the PM attribute is enabled, the rubric used for scoring the EAS assessment includes scanning all strokes made on the EAS assessment and finding a stroke that is recognized to be the PM specified symbol, e.g., "]." The progress is scored based on the location of the recognized PM specified symbol. The PM specified symbol does not have to be located within a collection zone 404 to be detected—all strokes are scanned.

The question attributes provide information that is used for the purpose of generating reports and data mining. Exemplary optional question attributes include Strand and Label.

Strand

The Strand attribute associated with a question zone 403 includes a string attribute that provides additional metadata describing the intent of the question. This value is not used during grading, but can be used during the preparation of reports and data mining.

Label

The Label attribute associated with a question zone 403 includes another string attribute that provides additional metadata describing the intent of the question. This value is not used during grading, but can be used during the preparation of reports and data mining.

The collection attributes describe how to interpret item data (described below) for each item of the group of at least one item associated with the collection zone, wherein the interpretation outputs collection data. Examples of required collection attributes include Name, CollectionType (CType), MarkType (MType), KeyItems, Target, Grade Points, and Gradable. Optional attributes include: DisplayName, RequireAllKeys, AllowPartialCredit, Descriptor, Strand, Label, and Rect.

Name is a string attribute specifying a unique name for each collection.

DisplayName is an optional string attribute specifying a not necessarily unique name of the collection for display purposes. If not specified, the Name attribute will be used.

CollectionType (CType) specifies the type of question that is associated with the collection zone 404. Items 1-7 below are exemplary types of questions and the disclosure is not limited thereto.

1) Single

Single collection zones 404 contain only a single item zone 406. For example, in an EAS reading assessment for measuring reading accuracy, the assessment-taker reads a paragraph and the teacher marks a stroke by each word that was mispronounced or misread, indicating that there was an error. In FIGS. 7A and 7B, EAS assessments 704 and 708 each include at least one collection zone 404 having a CType Single. In each of assessments 704 and 708 the entire page could be defined to include a single collection zone 404, or each line or a group of lines could be defined to form a collection zone 404.

2) MultipleChoice

MultipleChoice collection zones 404 represent multiple choice questions where there is more than one option. Each option has an item zone 406 associated with it. In a MultipleChoice collection zone 404 there is at least one KeyItem (described further below) which identifies the "correct" option. There may be more than one KeyItem or "correct" option. Examples of MultipleChoice collection zones 404 are shown in the collection zones 504 include in regions 502a and 502b of FIG. 5 and in the collections zones 404 of assessment 706 of FIG. 7B.

4) Survey

Survey collection zones 404 are another form of MultipleChoice collection zones 404, but there are no KeyItems in a Survey collection zone 404. A Survey collection zone 404 is not scored. Rather, the selected item zones 406 are recorded.

5) Connector

Figure 8:
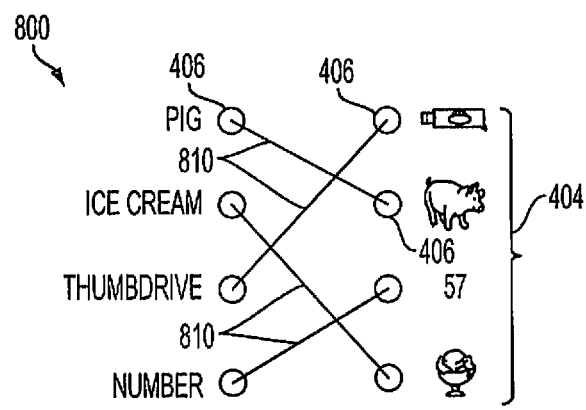
FIG. 8 is a pictorial representation of a Connector collection zone in accordance with the present disclosure.

A Connector collection zone 800, as shown in FIG. 8, includes a left and right column of item zones 406. Each item zone 406 is accompanied by a label such as a string of text or a graphical picture. The assessment-taker is instructed to match item zones 406 in the left column with item zones 406 in the right column by drawing a connector 810 between matching item zones 406. Each item zone in the left column is marked as a KeyItem, and the appropriate item zone 406 in the right column is attached to the KeyItem through the item zone's 406 Link attribute (described further below). The assessment creation module 220 provides means to designate the correct linkages for grading purposes.

6) Capture

Capture collection zones 404 have a single item zone 406. The stroke lifting module 320 captures the bitmap located within the item zone's 406 rectangular boundary and the text may be evaluated by the evaluator module or by the user of the second workstation 106. Capture collection zones 404 can be used to capture answers to essay questions, signatures, fill in the blank, short answers, etc.

7) Unknown

This collection type is used to define collection zones 404 whose rubric is not yet defined or implemented.

MarkType (MType)

The hierarchical zones of an EAS template describe all of the markable areas of an EAS assessment page. Associated with each collection zone 404 is an attribute called the MType that specifies how a stroke is to be interpreted. Generally, each CType only supports one or two MTypes, but the system is designed to be as general as possible. The currently defined MarkTypes are:

1) IndicatesError Stroke indicates the response was incorrect (IE)
2) IndicatesCorrect Stroke indicates the response was correct (IC)
3) SelectsResult Stroke indicates which item(s) are selected (SR)
4) IsResult The Value attribute of the marked item represents the expected answer. This may be derived from the stroke by processing the stroke using Intelligent Character Recognition (ICR) or Optical Character Recognition (OCR) or another algorithm depending on the item zone attributes described below.
5) Connector Stroke(s) must be analyzed and reduced to a set of lines that connect items in a Connector collection zone 404 (CN)
6) Bitmap An actual image associated with the ItemZone rectangle is captured
7) The exemplary implementation limits valid MTypes for each Collection Type as shown in Table 1 below:

TABLE 1

| Collection Type | Mark Type |
| --- | --- |
| Single | IndicatesError |
|  | IndicatesCorrect |
|  | IsResult |
| MultipleChoice | SelectsResult |
|  | IndicatesError |
| Survey | SelectsResult |
| Connector | Connector |
| Capture | Bitmap |

With the exception of the Single and MultipleChoice CollectionTypes, only one MarkType is allowed to be used for a CollectionType. The interpretation of marks may be specified within the Item zone attributes, as described further below, instead or in addition to the MType attributes.

KeyItems

Typically, Collection zones 404 have one or more "right" answers, meaning that when those item zones 406 are marked, the collection zone 404 is scored as having been answered correctly. KeyItems includes a list of the item zones 406 contained within the collection zone 404 that have been identified as "correct."

RequireAllKeys

For those collections that have more than one KeyItem identified, this attribute indicates when the rubric used is to give full credit if at least one of the KeyItems has been marked, or only when all KeyItems are marked.

AllowPartialCredit

For those collections with multiple Keys, give partial credit depending on how many items are marked correctly.

Target

The Target attribute for each collection zone 404 stores a string value which represents the "correct" answer to a question. This string value is typically the value associated with the KeyItem.

Descriptor

The Descriptor attribute provides flexibility and versatility for EAS templates and is described fully below.

Grade Points

The Grade Point attribute specifies the point value associated with each collection zone 404. When the evaluator module determines that the question in the collection zone 404 was answered correctly, the corresponding amount of points indicated in the Grade Points attribute are added to the score associated with the EAS assessment being evaluated. When the answer was wrong, the points are not awarded. The teacher has an opportunity to change the scoring during the EAS validation process, e.g., by awarding partial credit, etc. The Grade Point attribute applies to all collections except Survey, which are not graded.

Strand

The Strand attribute associated with a collection zone 404 includes a string attribute that provides additional metadata describing the intent of the collection. This value is not used during grading, but can be used during the preparation of reports and data mining. If the collection zone 404 is included in an optional question zone 403, the strand zone of the collection zone 404 supersedes the strand zone of the associated question zone 403 when being evaluated.

Label

The Label attribute associated with a collection zone 404 includes another string attribute that provides additional metadata describing the intent of the collection. This value is not used during grading, but can be used during the preparation of reports and data mining. If the collection zone 404 is included in an optional question zone 403, the label zone of the collection zone 404 supersedes the label zone of the associated question zone 403 when being evaluated.

Gradable

The Gradable attribute tells the evaluator module 322 whether or not it should include the score for the associated collection zone 402 in the overall grade of the EAS assessment. When this attribute is false, then the score for the associated collection zone 404 will not be counted in the overall grade, even when it is not a Survey collection zone 404.

Rect

The Rect attribute defines the bounding box of the collection zone 404 relative to the upper left hand corner of the unmarked scanned EAS Assessment page (the original raster). The stroke lifting module 320 registers (e.g., aligns) the marked EAS assessment page to the unmarked EAS page prior to lifting the marks. The bounding rectangle is optional. Other types of spatial, digital or temporal boundaries are envisioned as well, such as digital section breaks that divide a digital document into sections, or digital time stamps that provide temporal boundaries. When the assessment template includes more than one page, the Rect attribute specifies the page that includes the collection zone 404.

The item attributes describe how to interpret a stroke that was made in the location associated with the item zone, wherein the interpretation outputs item data. Exemplary required item attributes include Name, IsKey, Value, Rect. Optional attributes are: Parameters, ICR, Linear, and Link. The attributes are extensible and users of the EAS system 100 may add or remove attributes according to design choice in accordance with their specific implementation.

The IsKey attribute includes a Boolean value indicating whether or not the item zone 406 is a KeyItem. The term "KeyItem" is described further below.

Name
  Name is a string attribute that provides a unique name for this item zone.

Value
  The Value attribute includes a string that corresponds to the "value" of the associated item zone 406. For item zones that correspond to words, the item Value is the word itself; for item zones 406 in which the assessment-taker writes the answer within a designated rectangular area, the item Value is the result of character recognition; for multiple choice items the item Value is the item zone Name etc. The authoring tool provided with the first EAS workstation 102 allows the EAS assessment author to specify any string as the item Value. During grading, the resulting item(s) Values are compared to the collection's Target attribute to determine whether the question is right or wrong.

Parameters
  The Parameters attribute includes a dictionary of name-value pairs that contain textual data relevant to the associated item zone 406. This is an extensible attribute that can store a variety of information in the EAS template. An example provided below is the min/max values associated with a Linear item (see the description of the Linear attribute below).

Figure 9:
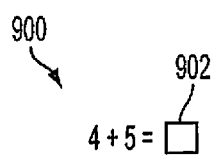
FIG. 9 is a pictorial representation of a Single collection zone having a single item zone delineated by a box whose contents are processed using character recognition techniques in accordance with the present disclosure.

ICR
  The ICR attribute is a Boolean value that informs the evaluator module 322 that the strokes lifted from within an item zones 406 designated rectangular values should be processed using ICR or (OCR for handwritten text) to generate the item Value. It is this recognized value that is compared to the collection's Target value to determine when the question has been answered right or wrong. Referring to FIG. 9, Single collection zone 900 includes a single item zone 406 delineated by box 902. The assessment-taker will mark the assessment by writing an answer in the box 902. The strokes marked in the box 902 are processed using OCR or ICR and a string is generated. The Target attribute for the associated collection zone 404 is "9". When the string generated is equivalent to the Target attribute "9," then the corresponding collection zone 900 is scored as being correct.

Figure 10:
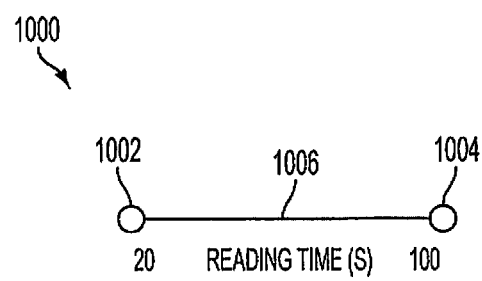
FIG. 10 is a pictorial representation of a collection zone having a linear item in accordance with the present disclosure.

Linear
  Linear items are used to select an arbitrary value between two known limits assigned a minimum and maximum value, Min and Max, respectively. For example, the item zone 406 may indicate how much time it took to read a paragraph aloud, with Min=20 seconds and Max=100 seconds. The teacher marks the linear item with a stroke to indicate the amount of time that it took the assessment-taker to read the paragraph. The evaluator module 322 extrapolates the item value by comparing the location of the stroke relative to the location of the Min and Max limits, and then scaling the relative location to the values that are specified in the Parameters for Min and Max. With reference to FIG. 10, collection zone 1000 includes a Linear item having a first and second limits assigned Min and Max values 20 seconds and 100 seconds, respectively. The teacher will make a stroke along scale 1006 to indicate an amount of time. The stroke is lifted by the stroke lifting module 320, and the location of the stroke is compared to the location of the first and second limits. The relative location is scaled to have a relative value with respect to the values assigned to the Min and Max.

Link
  Link attributes are used to indicate that a first item zone 406 is linked to a second item zone 406. In one implementation the Link attribute includes a list of item zones 406 Names. In a second implementation the Link attribute is the Name of the single linked item zone 406 The Link attribute allows the EAS template to store which item zones 406 are linked to KeyItems in the Connector collections.

Rect
  The Rect attribute defines the bounding box of the item zone 406 relative to the upper left hand corner of the unmarked scanned EAS Assessment page (the original raster). The stroke lifting module 320 registers (e.g., aligns) the marked EAS assessment page to the unmarked EAS page prior to lifting the marks. The bounding rectangle is optional, but is highly recommended for item zones 406 to indicate to the assessment-taker where to make marks. Other types of spatial, digital or temporal boundaries are envisioned as well, such as digital section breaks that divide a digital document into sections, or digital time stamps that provide temporal boundaries. When the assessment template includes more than one page, the Rect attribute specifies the page that includes the item zone 406.

Descriptor
  The Descriptor attribute include one or more expressions associated with each collection zone 404 that are dynamically evaluated by the descriptor evaluator module 324 during the EAS analysis process for generating an output result, e.g., a value or one or more strings, which are stored in association with the grading results for that collection zone 404. The string stored is selected, for example, in accordance with whether a question was answered correctly or not, or in accordance with which incorrect or correct answer was given. The output of the Descriptor expression indicates a qualitative meaning associated with possible responses that the assessment-taker may have indicated in association with the collection zone 404. For example, the possible responses may include incorrect responses, such as responses that are different than an expected response. The Descriptor attribute may evaluate the response to provide qualitative information about what type of mistake the assessment-taker made.

For example, an EAS template may store the Descriptor "longdivision" in association with each incorrect answer that corresponds with a collection zone 404 having a long division math question that was answered incorrectly. After evaluating EAS assessments taken by a class, school-wide grade, city-wide grade, etc., of assessment-takers, a report may be generated that indicates a pattern, such as that a high percentage of students were having problems with long division. When it is discovered that an inordinate amount of students were struggling with the same type of task, the specific problem may be addressed. An improvement or decline in student performance for specific tasks may be correlated with information linked to the EAS assessment, such as teaching methods or teachers used to teach the material.

Similarly, patterns of strengths or weaknesses may be found for individual students. The EAS template may store the Descriptor "dyslexia" in association with particular types of wrong answers which are indicators of possible dyslexic tendencies. For example, a fourth grade student may repeatedly incorrectly write or read "d" instead of "b", but the pattern may only be noticeable by examining a series of EAS assessments taken by that student. When the Descriptor expression is included with the results, a database search over many relevant EAS assessments may uncover a pattern that the student's results have triggered an inordinate number of 'dyslexia' Descriptors and therefore prompt the teacher to investigate further.

The Descriptor strings may be defined by educational experts for enabling useful information extraction. An exemplary syntax for use with Descriptors is shown below, however, the disclosure is not limited thereto.

1) Descriptor information is encoded as one or more expressions separated by a ';'
2) expressions have one of the following forms:
   d) SEL ? dsc1 : dsc2 apply dsc1 when question was answered correctly, else apply dsc2
   e) SEL ? dsc1 apply dsc1 when question was answered correctly, else nothing
   e) SEL : dsc1 apply dsc1 when question was answered incorrectly, else nothing
   f) SKIPPED ? dsc1 : . . . apply dsc1 when question was skipped, else evaluate next expression
   f) SKIPPED : dsc1 apply dsc1 when question was not skipped, else nothing
   g) SEL EQ val ? dsc1 : . . . apply dsc1 when selection has the value 'val', else evaluate next expression
   h) SEL NE val ? dsc1 : . . . apply dsc1 when selection does not have the value 'val', else evaluate next expression
   i) SEL EQ #nth ? dsc1 : . . . apply dsc1 when selection was the nth choice, else evaluate next expression (n starts with 0)
   j) SEL NE #nth ? dsc1 : . . . apply dsc1 when selection was not the nth choice, else evaluate next expression (n starts with 0)

In addition, there are a few shortcut expressions which are not combined with the more general syntax above:
   a) dsc apply dsc when question was answered incorrectly
   b) dsc1 : dsc2 apply dsc1 when question was answered correctly, else apply dsc2
   c) dsc1 : apply dsc1 when question was answered correctly, else nothing Keywords are:
   SEL referred to as selection; when used by itself, it represents whether the question was answered right or wrong; when used with 'NE' or 'EQ' it represents the string associated with the selection or the selected item number (e.g., for multiple choice)
   SKIPPED when the question was skipped
   NE a 'Not Equal' test
   EQ an 'Equal' test
   ? when the SEL/SKIPPED phrase evaluates to true,
   : when the SEL/SKIPPED phrase evaluates to FALSE, In the above examples, 'dsc' is a simple string, e.g., "longdivision" or "dyslexia" that are the Descriptor values that may ultimately be stored in the EAS database 110; "val" denotes a string that Value attributes values are compared to. For example:

SEL EQ 4.33 ? longdivision means that when the selection value was "4.33," then apply the Descriptor "longdivision."

The symbol "#" numerically identifies a member of a multiple choice question (starting with 0). When a multiple choice question had 4 possible items, then SEL EQ #3 ? addition : SEL EQ #2 ? division : SEL EQ #1 ? multiplication : subtraction would cause the Descriptor "addition" to be applied when item 3 was selected. When item 2 was selected the Descriptor "division" would be applied; when item 1 was selected then the Descriptor "multiplication" would be applied; and when item 0 was selected then the Descriptor "subtraction" would be applied.

The Descriptor and its syntax may be supported, for example, by hardcode, by a general interpreter, or other means. The assessment authoring tool may provide a wizard for creating Descriptor expressions in order that assessment authors will not have to deal directly with the Descriptor's syntax.

Descriptors may further be applied to Region zones 402, such as in the form of simple strings, such as for indicating that a region zone 402 assesses Math or English. Descriptors applied to region zones 402 may only be for descriptive purposes and may not be processed for the purposes of evaluation. On the other hand, it is envisioned that region Descriptors could be evaluated as well.

The Descriptors provide the advantage of utilizing the expertise of educational experts in order to exploit the meaning behind the way in which a questions are answered, cull usable knowledge, detect patterns, perform data mining, perform searching functions, provide useful reports, etc. from the large amount of information that can be gathered in the EAS database. Information stored in remote EAS databases may be shared, such as for discovering further patterns. Accordingly, pattern detection and reporting quality per student as well as on a school, school district, nationwide and/or international may be enhanced.

EAS systems may further gather additional information related to the assessment-takers, the EAS assessments, the teachers that taught the material being assessed, teaching methods used, etc. This information can be gathered on a granular level per individual student, per EAS assessment, or per an assessment-taker population group, e.g., class, school, school district, etc. U.S. patent application Ser. Nos. 12/339,979, 12/340,054, and 12/340,116, all to German et al. entitled "SYSTEM AND METHOD FOR RECOMMENDING EDUCATIONAL RESOURCES," and filed on Dec. 19, 2008, herein incorporated by reference in their entirety, describe a system and method for making educational recommendations by correlating granular assessment data with other information. Granular assessment data indicates student performance for each question in an administered assessment. The enhanced reporting enabled by the creation and utilization of the EAS template enhances correlation of granular assessment information with other information associated with the assessment-takers, the EAS assessment, the teachers, the teaching methods used, etc. This correlation can yield information that may be used to enhance the educational process, such as by identifying the best way to help individual students, selecting effective teaching methods, recognizing past successes and failures, etc.

In operation, with return reference to FIG. 1, at step 0, the assessment author uses the first workstation 102 to author an EAS assessment and an associated EAS template, or to author an EAS template to be associated with an existing EAS assessment. At step 1, a user of the EAS MFD 104 selects an EAS assessment to administer and prints sufficient copies of the EAS assessments. The user of the EAS MFD 104 may retrieve a selected EAS assessment, such as by sending a request from a workstation, e.g., EAS workstation 102 or a personal computer, or operating the user interface 116 to request that the EAS MFD 104 print a selected EAS assessment. Each copy may be individualized by providing information, such as a unique ID, identification (ID code or name) of the assessment-taker that will be administered the EAS assessment, the date, etc. The individualized information may be encoded, such as in an optical code, such as a barcode, associated with an optical zone 604 of the EAS template associated with the EAS assessment. At step 2 the EAS is administered to the assessment-takers who mark the EAS assessment with strokes to indicate their answers. At step 3, a user of the EAS MFD 104 scans the marked assessments. The scanned assessments are stored either locally by the EAS MFD 104 or in the EAS database 110.

At step 4, the scanned assessments are evaluated by the EAS evaluator 108 using the associated EAS template. The evaluation may be a preliminary evaluation. The evaluation may occur automatically or may be requested by the EAS MFD 104, a workstation, or a user interface in data communication with the EAS evaluator 108. The request may indicate the type of evaluation that is requested and further identifies the scanned assessments that should be evaluated. The scanned assessments may be provided to the EAS evaluator 108 by the EAS MFD 104 or the EAS evaluator 108 may be retrieved by the EAS database 110. The associated EAS template may be provided by another processing device, such as the first workstation 102, or the EAS evaluator 108 may be retrieved by the EAS evaluator 108 from the EAS database 110. After evaluation, the evaluated assessments are stored locally by the EAS evaluator and/or are stored by the EAS database 110.

When a scanned assessment is evaluated by the stroke lifting module 320, the evaluator module 322 and the descriptor evaluator module 324, they each access the EAS template and output data that may be used during one of the other modules 320, 322 or 324 during runtime. The stroke lifting module 320 evaluates the scanned assessment by using information provided in the EAS template, namely information in the rect Item attribute that tells the stroke lifting module the locations in the scanned assessment from which to retrieve strokes. The stroke lifting module 320 outputs data (e.g., an XML text file) with information about each of the retrieved strokes. The evaluator module 322 uses the EAS template to interpret the output from the stroke lifting module 320, including attributing values to strokes when appropriate, evaluating whether the strokes should be scored as correct or incorrect, and generating scores to be associated with the question, collection and/or region zones. This may be done dynamically as the stroke lifting module 320 performs its evaluation, or it may done after the stroke lifting module 320 has completed its evaluation.

The descriptor evaluator module 324 evaluates the EAS template's Descriptor attributes using the output from the evaluator module. This may be done dynamically as the evaluator module 322 performs its evaluation or after the evaluator module 322 has completed its evaluation. The descriptor evaluator module 324 outputs data (e.g., an XML text file) that represents the results of its evaluation.

At step 5, a user of the second workstation 106 reviews the evaluated assessments. The user may be the same teacher that administered the EAS assessments or may be another individual, such as with expertise in validating or annotating EAS assessments. The review of the evaluated assessments includes validating the evaluation results, correcting evaluation results, and/or annotating the evaluated assessments. The correcting of the evaluation results may include updating the data output by the evaluator module 322. The evaluated assessments may be provided to the second workstation 106 by the EAS evaluator 108, or the second workstation 106 may retrieve the evaluated assessments from the EAS database 110. The validated and annotated assessments are stored locally by the second workstation 106 and/or are stored by the EAS database 110.

At step 6, the EAS evaluator 108 and/or the descriptor evaluator module 324 generate reports. If during the validation step 5 the user corrected evaluation results, at step 6 the evaluator module 322 may need to perform its evaluation again of all or a part of the validated assessment. This may not be necessary if the evaluation results were corrected during step 5. Generation of the reports by the descriptor evaluator module 324 at step 6 may include reevaluating any portions of the validated assessment that were corrected or updated by the user in step 5. The generated reports may indicate scores for the individual EAS assessments, indicate patterns associated with the individual student that took the EAS assessment, and/or indicate patterns associated with other EAS assessments, including the currently administered EAS assessment or historically administered EAS assessments. The reports may involve data mining and data processing that utilizes the features of the EAS template to cull useful information from the EAS evaluations, as discussed further above. Users may access the reports, request specific types of evaluations and reports, etc., such as via a workstation in data communication with the EAS evaluator 108, such as the second workstation 106.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A processing system, for processing a digital assessment template, comprising:
   at least one tangible processor;
   a memory with instructions to be executed by the at least one tangible processor for:
   processing a digital assessment template which includes a description of a plurality of data structures that are configured for interpreting a written assessment associated with the template, wherein said written assessment was marked with strokes by an assessment-taker responding to at least one problem provided by the written assessment, and wherein the digital assessment template describes one or more locations of the marked written assessment in which to find each stroke that corresponds to a response by the assessment-taker and how to interpret the strokes wherein the type of the stroke to be marked in the one or more locations can vary according to the response demanded by the at least one problem, and wherein each of the one or more locations and how to interpret the strokes are selectable amongst a plurality of different types of strokes and wherein the processing the template comprises:
   evaluating the marked written assessment using the plurality of data structures described by the template;
   interpreting the marked written assessment using the plurality of data structures described by the template;
   analyzing the marked written assessment using the plurality of data structures described by the template; and creating the template, wherein the template describes at least two hierarchical levels of zones comprising:
a plurality of item zones having a low hierarchical level; and
at least one collection zone having a higher hierarchical level, wherein each collection zone of the at least one collection zone is associated with a different problem of the at least one problem and includes a group of at least one item zone of the plurality of item zones, each item zone of the plurality of item zones being associated with one of the described locations and indicating a possible response by the assessment-taker, the number of item zones included in each group being selectable, and wherein each item zone of the plurality of item zones is associated with at least one attribute that describes how to interpret a particular kind of stroke that was made in the location associated with the item zone, wherein the interpretation outputs item data and wherein each collection zone of the at least one collection zone is associated with at least one attribute describing how to interpret item data for each item of the group of at least one item associated with the collection zone, wherein the interpretation outputs collection data, wherein the at least one attribute associated with the at least one collection zone includes a descriptor that indicates a qualitative meaning associated with possible responses indicated by the at least one item included in the group of the collection zone, including indicating a meaning associated with a response that is different than an expected response.

2. The processing system according to claim 1, wherein the at least two hierarchical levels of zones further includes at least one region zone having a higher hierarchical level than that of the at least one collection zone, wherein each region zone includes:
a group of at least one collection zone based on a common quality; wherein each region zone of the at least one region zone is associated with at least one attribute including a rubric algorithm that processes the collection data for each collection zone of the group of at least one collection zones included in the region for scoring the at least one collection zone, and wherein how to score the at least one problem is selectable.

3. The processing system according to claim 2, wherein the at least two hierarchical levels of zones further include at least one question zone having a higher hierarchical level than that of the at least one collection zone and a lower hierarchical level than the at least one region zone, wherein each question zone includes a group of at least one collection zone based on a second common quality, wherein one or more selected region zones of the at least one region zone includes one or more question zones of the at least one question zone, and wherein each question zone of the at least one question zone is associated with at least one attribute for describing the question zone.

4. The processing system according to claim 2, wherein the marked written assessment includes at least two physical pages, each of the physical pages including one or more problems of the at least one problem; the template further describes at least two pages, wherein each page of the at least two pages of the template corresponds to a physical page of the at least two physical pages of the marked written assessment in a one to one correspondence; and each page includes one or more collection zones of the at least one collection zone that correspond to the problems of the one or more problems included with the corresponding physical page, all of the region zones of the at least one region zone that include the included one or more collection zones, and all of the item zones of the at least one item zone that are included in the included one or more collection zones.

5. The processing system according to claim 1, wherein the at least one attribute associated with the collection zone describes a type of the group of at least one item, the type of groups selected from the group of group types consisting of:
a single item group that has one item that may or may not be selected;
a group that has at least one item that needs to be processed with character recognition;
a group having multiple items that may be selected from;
a group in which two or more items included in the group of at least one item are linked to one another and the link determines whether the response is correct;
a group that is not scored; and
a group that is scored.

6. The processing system according to claim 1, wherein the at least one attribute associated with the collection zone describes an expected response that is used for scoring the collection zone.

7. A processing system for processing a digital assessment template, comprising:
at least one tangible processor;
a memory with instructions to be executed by the at least one tangible processor for:
accessing a digital assessment template which includes:
a description of a plurality of data structures that are configured for interpreting a written assessment associated with the template, wherein said written assessment was marked with strokes by an assessment-taker responding to at least one problem provided by the written assessment, wherein the digital assessment template describes:
one or more locations of the marked written assessment in which to find each stroke that corresponds to a response by the assessment-taker;
how to interpret the strokes wherein the type of the stroke to be marked in the one or more locations can vary according to the response demanded by the at least one problem;
at least two hierarchical levels of zones, including:
a plurality of item zones having a low hierarchical level and at least one collection zone having a higher hierarchical level, wherein each collection zone of the at least one collection zone is associated with a different problem of the at least one problem and includes a group of at least one item zone of the plurality of item zones, each item zone of the plurality of item zones being associated with a location of the marked written assessment in which to find each stroke that corresponds to a response by the assessment-taker; and each of the locations, how to interpret a strokes, and the number of item zones included in each group are selectable, wherein each item zone of the plurality of item zones is associated with at least one attribute that describes how to interpret a particular kind of stroke that was made in the location associated with the item zone, wherein the interpretation outputs item data, wherein each collection zone of the at least one collection zone is associated with at least one attribute describing how to interpret item data for each item of the group of at least one item associated with the collection zone, wherein the interpretation outputs collection data and wherein the at least one attribute associated with the at least one collection zone includes a descriptor that indicates a qualitative meaning associated with possible responses indicated by the at least one item included in the group of the collection zone, including indicating a meaning associated with a response that is different than an expected response; and the processing the template includes at least one of:
  evaluating the marked written assessment using the template;
  interpreting the marked written assessment using the template;
  analyzing the marked written assessment using the template; and,
  creating the template.

8. The processing system according to claim 7, wherein each collection zone of the at least one collection zone is associated with at least one attribute describing how to interpret item data for each item of the group of at least one item associated with the collection zone, wherein the interpretation outputs collection data.

9. The processing system according to claim 7, wherein the at least two hierarchical levels of zones further include at least one region zone having a higher hierarchical level than that of the at least one collection zone, wherein each region zone includes a group of at least one collection zone based on a common quality, wherein each region zone of the at least one region zone is associated with at least one attribute including a rubric algorithm that processes the collection data for each collection zone of the group of at least one collection zones included in the region for scoring the at least one collection zone, and wherein how to score the at least one problem is selectable.

10. A non-transitory computer-readable medium storing a series of programmable instructions configured for execution by at least one hardware processor for performing a method for processing a digital assessment template comprising the steps of:

storing a digital assessment template which includes a description of a plurality of data structures that are configured for interpreting a written assessment associated with the template, wherein the written assessment was marked with strokes by an assessment-taker responding to at least one problem provided by the written assessment, wherein the digital assessment template describes a location of the marked written assessment in which to find each stroke that corresponds to a response by the assessment-taker and how to interpret the strokes wherein the type of the stroke to be marked in the location can vary according to the response demanded by the at least one problem, wherein each of the locations and how to interpret the strokes are selectable amongst a plurality of different types of strokes, wherein the template describes at least two hierarchical levels of zones, including a plurality of item zones having a low hierarchical level and at least one collection zone having a higher hierarchical level, wherein each collection zone of the at least one collection zone is associated with a different problem of the at least one problem and includes a group of at least one item zone of the plurality of item zones, each item zone of the plurality of item zones is associated with one of the described locations and indicates a possible response by the assessment-taker; and the number of item zones included in each group is selectable, wherein each item zone of the plurality of item zones is associated with at least one attribute that describes how to interpret a particular kind of stroke that was made in the location associated with the item zone, wherein the interpretation outputs item data, wherein each collection zone of the at least one collection zone is associated with at least one attribute describing how to interpret item data for each item of the group of at least one item associated with the collection zone, wherein the interpretation outputs collection data and wherein the at least one attribute associated with the at least one collection zone includes a descriptor that indicates a qualitative meaning associated with possible responses indicated by the at least one item included in the group of the collection zone, including indicating a meaning associated with a response that is different than an expected response; and processing the template, the processing including at least one of:
  evaluating the marked written assessment using the template;
  interpreting the marked written assessment using the template;
  analyzing the marked written assessment using the template; and
  creating the template.

11. The non-transitory computer-readable medium according to claim 10, wherein the at least two hierarchical levels of zones further include at least one region zone having a higher hierarchical level than that of the at least one collection zone, wherein each region zone includes a group of at least one collection zone, wherein the collection zones are grouped based on a common quality, wherein each region zone of the at least one region zone is associated with at least one attribute including a rubric algorithm that processes the collection data for each collection zone of the group of at least one collection zones included in the region for scoring the at least one collection zone; and wherein how to score the at least one collection zone is selectable.

12. The non-transitory computer-readable medium according to claim 10, wherein the at least one attribute associated with the collection zone describes a type of the group of at least one item, the type of groups selected from the group of group types consisting of:
  a single item group that has one item that may or may not be selected;
  a group that has at least one item that needs to be processed with character recognition;
  a group having multiple items that may be selected from;
  a group in which two or more items included in the group of at least one item are linked to one another and the link determines whether the response is correct;
  a group that is not scored; and
  a group that is scored.

* * * * *